(12) United States Patent
Itazu et al.

(10) Patent No.: US 9,309,965 B2
(45) Date of Patent: Apr. 12, 2016

(54) DEVICE FOR CONTROLLING POWER TRANSMISSION APPARATUS

(75) Inventors: Naoki Itazu, Nagoya (JP); Toshiya Yamashita, Toyota (JP); Yoichi Nakashima, Nisshin (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 118 days.

(21) Appl. No.: 14/380,136

(22) PCT Filed: Feb. 22, 2012

(86) PCT No.: PCT/JP2012/054220
§ 371 (c)(1),
(2), (4) Date: Aug. 21, 2014

(87) PCT Pub. No.: WO2013/124976
PCT Pub. Date: Aug. 29, 2013

(65) Prior Publication Data
US 2015/0021136 A1    Jan. 22, 2015

(51) Int. Cl.
*F16H 61/14* (2006.01)
*F02D 29/02* (2006.01)
*F02D 29/00* (2006.01)

(52) U.S. Cl.
CPC .............. *F16H 61/143* (2013.01); *F02D 29/00* (2013.01); *F02D 29/02* (2013.01)

(58) Field of Classification Search
CPC ............................... F16H 61/143; F02D 29/02
See application file for complete search history.

(56) References Cited

U.S. PATENT DOCUMENTS

| 5,876,306 A | * | 3/1999 | Murata | B60W 30/20 |
| | | | | 192/103 F |
| 7,328,095 B2 | * | 2/2008 | Imamura | F16H 61/143 |
| | | | | 701/67 |
| 2007/0202987 A1 | | 8/2007 | Kakinami et al. | |
| 2010/0004089 A1 | | 1/2010 | Iwase et al. | |

(Continued)

FOREIGN PATENT DOCUMENTS

| JP | 05-087190 A | 4/1993 |
| JP | 05-296338 A | 11/1993 |

(Continued)

*Primary Examiner* — Jacob S Scott
*Assistant Examiner* — Tinh Dang
(74) *Attorney, Agent, or Firm* — Kenyon & Kenyon LLP (57) ABSTRACT

A control device of a power transmission device includes a damper absorbing torsional vibration between a fluid transmission device with a lockup clutch and an engine, the power transmission device is disposed with a connecting/disconnecting device capable of connecting and interrupting power transmission on the downstream side of the fluid transmission device, the control device has a lockup engagement control means engaging the lockup clutch while the power transmission is interrupted by the connecting/disconnecting device in a predetermined engine rotation speed range lower than an idle rotation speed when the engine is started, the lockup engagement control means includes: a resonance due to frequency entrainment determination means determining whether a resonance due to frequency entrainment occurs that blocks an increase in an engine rotation speed NE depending on whether a predefined resonance determination time is exceeded by a required start time of the engine or an elapsed time until the engine rotation speed NE reaches a predetermined rotation speed; a lockup engagement means engaging the lockup clutch while the power transmission is interrupted by the connecting/disconnecting device when the resonance due to frequency entrainment determination means determines that the resonance due to frequency entrainment occurs.

5 Claims, 10 Drawing Sheets

(56) References Cited

FOREIGN PATENT DOCUMENTS

| JP | 06-037568 | U | | 5/1994 | |
| JP | H09-236139 | A | | 9/1997 | |
| JP | 2007-232069 | A | | 9/2007 | |
| JP | 2009-012532 | A | | 1/2009 | |
| JP | 2010084862 | A | * | 4/2010 | ............ F02D 29/00 |

* cited by examiner

|     | C1 | C2 | B1 | B2 | B3 | F1 |
|-----|----|----|----|----|----|----|
| 1st | O  |    |    | ◎  |    | △  |
| 2nd | O  |    | O  |    |    |    |
| 3rd | O  |    |    |    | O  |    |
| 4th | O  | O  |    |    |    |    |
| 5th |    | O  |    |    | O  |    |
| 6th |    | O  | O  |    |    |    |
| Rev |    |    |    | O  | O  |    |
| N   |    |    |    |    |    |    |

◎ ACTUATED DURING ENGINE BRAKE
△ ACTUATED ONLY DURING DRIVE

| DAMPER RIGIDITY (Nm/rad) | RESONANT ROTATION SPEED (rpm) | OUTSIDE AIR TEMPERATURE (°C) | | | | | |
|---|---|---|---|---|---|---|---|
| | | NORMAL TEMPERATURE | -10 | -15 | -20 | -25 | -30 |
| 700 | 530 | ○ | ○ | ○ | × | × | × |
| 600 | 490 | ○ | ○ | ○ | × | × | × |
| 500 | 450 | ○ | ○ | ○ | ○ | × | × |

{ ○ : WITHOUT RESONANCE DUE TO FREQUENCY ENTRAINMENT
× : RESONANCE DUE TO FREQUENCY ENTRAINMENT OCCURS

DEVICE FOR CONTROLLING POWER TRANSMISSION APPARATUS

CROSS-REFERENCE TO RELATED APPLICATIONS

This is a national phase application based on the PCT International Patent Application No. PCT/JP2012/054220 filed Feb. 22, 2012, the entire contents of which are incorporated herein by reference.

TECHNICAL FIELD

The present invention relates to a control device of a power transmission device and particularly to a technique of suppressing resonance due to frequency entrainment when an engine is started.

BACKGROUND ART

A power transmission device is known that includes a damper absorbing torsional vibration between a fluid transmission device with a lockup clutch and an engine. Such a power transmission device is referred to as of a pre-damper type in contrast to the case that a damper is disposed in series with the lockup clutch within the fluid transmission device. Devices described in Patent Documents 1 and 2 are examples thereof and a torque converter is used as the fluid transmission device. When the engine is started in such a power transmission device, engine start control such as cranking, fuel injection, and ignition is generally provided while the lockup clutch is released.

PRIOR ART DOCUMENTS

Patent Documents

Patent Document 1: Japanese Laid-Open Patent Publication No. 5-296338
Patent Document 2: Japanese Laid-Open Patent Publication No. 5-87190

SUMMARY OF THE INVENTION

Problem to be Solved by the Invention

However, in such a pre-damper type power transmission device, a resonant rotation speed of the damper may become lower than an idle rotation speed and resonance due to frequency entrainment may occur before the idle rotation speed is reached at the start of the engine, resulting in a delay of the engine start or deterioration in NV (noise, vibration). The resonance due to frequency entrainment is a phenomenon that an increase in engine rotation speed is blocked due to resonance near the resonant rotation speed of the damper when the rotation speed of the engine increases, and tends to occur when the resonant rotation speed is close to the idle rotation speed. Although the resonance due to frequency entrainment can be suppressed by reducing the resonant rotation speed, the reduction is limited by design requirements such as required damper rigidity and strength, and it is difficult to certainly suppress the resonance due to frequency entrainment because of variation in the resonant rotation speed from individual differences of portions etc. Such resonance due to frequency entrainment is particularly likely to occur when engine temperature is lower and engine friction is larger.

In Patent Document 2, when the engine is cranked for start, a pinion of a starter motor is meshed and integrally rotated with members before and behind the damper, or the members before and behind the damper are integrally coupled by a clutch, to prevent resonance attributable to the damper at the engine start; however, since this leads to complicated structure and an increase in parts count and weight as well as a necessity of considerable design change, sufficient satisfaction is not necessarily obtained.

The present invention was conceived in view of the situations and it is therefore an object of the present invention to suppress occurrence of resonance due to frequency entrainment near resonant rotation speed of a damper when an engine is started without an increase in parts count and weight in a pre-damper type power transmission device.

Means for Solving the Problem

To achieve the object, the first aspect of the invention provides a control device of a power transmission device including a damper absorbing torsional vibration between a fluid transmission device with a lockup clutch and an engine, (a) the power transmission device being disposed with a connecting/disconnecting device capable of connecting and interrupting power transmission on the downstream side of the fluid transmission device, (b) the control device having a lockup engagement control portion engaging the lockup clutch while the power transmission is interrupted by the connecting/disconnecting device in a predetermined engine rotation speed range lower than an idle rotation speed when the engine is started, (c) the lockup engagement control portion including: (c-1) a resonance due to frequency entrainment determination portion determining whether a resonance due to frequency entrainment occurs that blocks an increase in an engine rotation speed NE depending on whether a predefined resonance determination time is exceeded by a required start time of the engine or an elapsed time until the engine rotation speed NE reaches a predetermined rotation speed; (C-2) a lockup engagement portion engaging the lockup clutch while the power transmission is interrupted by the connecting/disconnecting device when the resonance due to frequency entrainment determination portion determines that the resonance due to frequency entrainment occurs.

The second aspect of the invention provides the control device of a power transmission device recited in the first aspect of the invention, the resonance due to frequency entrainment determination portion determines whether the resonance due to frequency entrainment occurs based on an elapsed time after the engine rotation speed NE exceeds a predetermined determination start rotation speed that is lower than a resonant rotation speed reoff of the damper at the time of release of the lockup clutch.

The third aspect of the invention provides the control device of a power transmission device recited in the first or second aspect of the invention, wherein when the engine rotation speed NE reaches a predefined lockup end rotation speed n2 that is higher than the resonant rotation speed reoff of the damper at the time of release of the lockup clutch, the lockup engagement portion releases the lockup clutch.

The fourth aspect of the invention provides the control device of a power transmission device recited in any one of the first to third aspects of the invention, wherein the lockup engagement control portion provides an engagement control of the lockup clutch on condition that temperature of the engine is lower than a predefined determination value ts at which a resonance due to frequency entrainment possibly occurs.

The fifth aspect of the invention provides the control device of a power transmission device recited in any one of the first to fourth aspects of the invention, wherein (a) the connecting/disconnecting device is an automatic transmission configured to establish a neutral state at which power transmission is interrupted, and wherein (b) the lockup engagement control portion provides an engagement control of the lockup clutch while the automatic transmission is in the neutral state.

Effects of the Invention

In the control device of a power transmission device as described above, since the lockup clutch is engaged by the lockup engagement control portion while the power transmission is interrupted by the connecting/disconnecting device in a predetermined engine rotation speed range lower than an idle rotation speed when the engine is started, the weight of the downstream side of the damper becomes larger and the resonant rotation speed decreases, suppressing the occurrence of the resonance due to frequency entrainment attributable to the damper at the engine start.

Since the resonance due to frequency entrainment attributable to the damper is suppressed as described above, the engine rotation speed NE can promptly be increased to properly start the engine in a short time, and the deterioration in NV (noise, vibration) attributable to the resonance is suppressed. Since the resonance due to frequency entrainment is suppressed by the engagement control of the lockup clutch, this example does not require a change in design of a hardware portion and is easily applicable to various power transmission devices.

Since it is determined whether resonance due to frequency entrainment occurs that blocks an increase in the engine rotation speed NE depending on whether a predefined resonance determination time is exceeded by a required start time of the engine or an elapsed time until the engine rotation speed NE reaches a predetermined rotation speed, and the lockup clutch is engaged if the resonance due to frequency entrainment occurs, the resonant rotation speed of the damper decreases from the resonant rotation speed reoff at the time of release of the lockup clutch to the resonant rotation speed reon at the time of engagement of the lockup clutch. As a result, the engine rotation speed NE relatively goes out of a resonant rotation speed range, escapes from the resonance due to frequency entrainment and is promptly increased, and the engine is properly started. Since the lockup clutch is subjected to the engagement control if the resonance due to frequency entrainment actually occurs, the useless provision of the engagement control of the lockup clutch is prevented as compared to when the engagement control of the lockup clutch is always uniformly provided in a predetermined engine rotation speed range.

In the third aspect of the invention, since when the engine rotation speed NE reaches a predefined lockup end rotation speed n2 that is higher than the resonant rotation speed reoff of the damper at the time of release of the lockup clutch, the lockup clutch is released, useless continuation of the engagement control of the lockup clutch is prevented while the occurrence of the resonance due to frequency entrainment is properly suppressed.

In the fourth aspect of the invention, since an engagement control of the lockup clutch is provided on condition that temperature of the engine is lower than a predefined determination value ts at which a resonance due to frequency entrainment possibly occurs, useless provision of the engagement control of the lockup clutch is prevented while the occurrence of the resonance due to frequency entrainment is properly suppressed.

In the fifth aspect of the invention, since an automatic transmission configured to establish a neutral state at which power transmission is interrupted is used as a connecting/disconnecting device, and an engagement control of the lockup clutch is provided while the automatic transmission is in the neutral state, the device is simply and inexpensively configured as compared to when a connecting/disconnecting device is disposed separately from the automatic transmission.

MODE FOR CARRYING OUT THE INVENTION

The present invention is preferably applied to a power transmission device for a vehicle and is also applicable to a power transmission device of a hybrid vehicle including an electric motor as a power source along with an engine. The engine is an internal combustion engine generating power from combustion of fuel. A torque converter or a fluid coupling is preferably used as a fluid transmission device. A damper absorbs torque variation of the engine and absorbs torsional vibration and is also referred to as a torsional damper, generally including an elastic body such as a compression coil spring.

Although a frictional engagement clutch is preferably used for a connecting/disconnecting device, an automatic transmission configured to establish a neutral state is available and the connecting/disconnecting device is employable in various forms capable of connecting and interrupting power transmission. Although the connecting/disconnecting device is controlled to interrupt the power transmission at least when a lockup clutch is engaged, the connecting/disconnecting device may be controlled to always interrupt the power transmission when engine start control is provided. The automatic transmission may be a forward/backward switching device of a planetary gear type etc. switching forward/backward running in accordance with engagement/release of friction engagement devices such as a clutch and a brake, or may be a stepped transmission of a planetary gear type, a parallel shaft type, etc. capable of switching a plurality of forward gear stages having different gear ratios.

At the engine start, the engine start control is provided that starts the engine by cranking the engine with a starter motor, for example, and performing fuel injection and ignition when a predetermined rotation speed is reached. In the case of a direct injection engine capable of injecting fuel directly into a cylinder, fuel injection and ignition can be performed for a cylinder with a piston stopped in an expansion stroke to perform an ignition start so that the engine is started without cranking with the starter motor, or by only assisting engine rotation as needed.

A lockup engagement control means provides engagement control of the lockup clutch such that resonance due to frequency entrainment attributable to the damper is suppressed when the engine is started. This engagement control of the lockup clutch determines whether resonance due to frequency entrainment occurs that blocks an increase in an engine rotation speed NE, and the lockup clutch is engaged if the resonance due to frequency entrainment occurs. Whether the resonance due to frequency entrainment occurs can be determined from whether a predefined resonance determination time is exceeded by a required start time of the engine rotation speed NE or an elapsed time until a predetermined rotation speed is reached, for example.

In the third aspect of the present invention, when the engine rotation speed NE reaches a predefined lockup end rotation speed n2 that is higher than the resonant rotation speed reoff, the lockup clutch is released; however, in the case of implementation of another aspect, the lockup clutch may be released when the engine becomes capable of rotating by itself or when the engine start control is terminated. Although the lockup end rotation speed n2 is set to, for example, a rotation speed lower than an idle rotation speed in consideration of variations of the resonant rotation speed reoff due to individual differences, temporal changes, etc. of the portions, the idle rotation speed may be defined as the lockup end rotation speed n2.

In the fourth aspect of the invention, the engagement control of the lockup clutch is provided on the condition that the temperature of the engine is low temperature lower than a predefined determination value ts at which the resonance due to frequency entrainment may occur, and the determination value ts is appropriately defined to include a temperature range in which the resonance due to frequency entrainment may occur, based on temperature characteristics of engine friction torque, presence/absence of occurrence of resonance, etc., and is set to a value of about −10 degrees C. to −15 degrees C., for example. When another aspect of the invention is implemented, the engine temperature may not necessarily be taken into consideration and the engagement control of the lockup clutch may always be provided.

Example

First, a reference example will now be described in detail with reference to the drawings.

Figure 1:
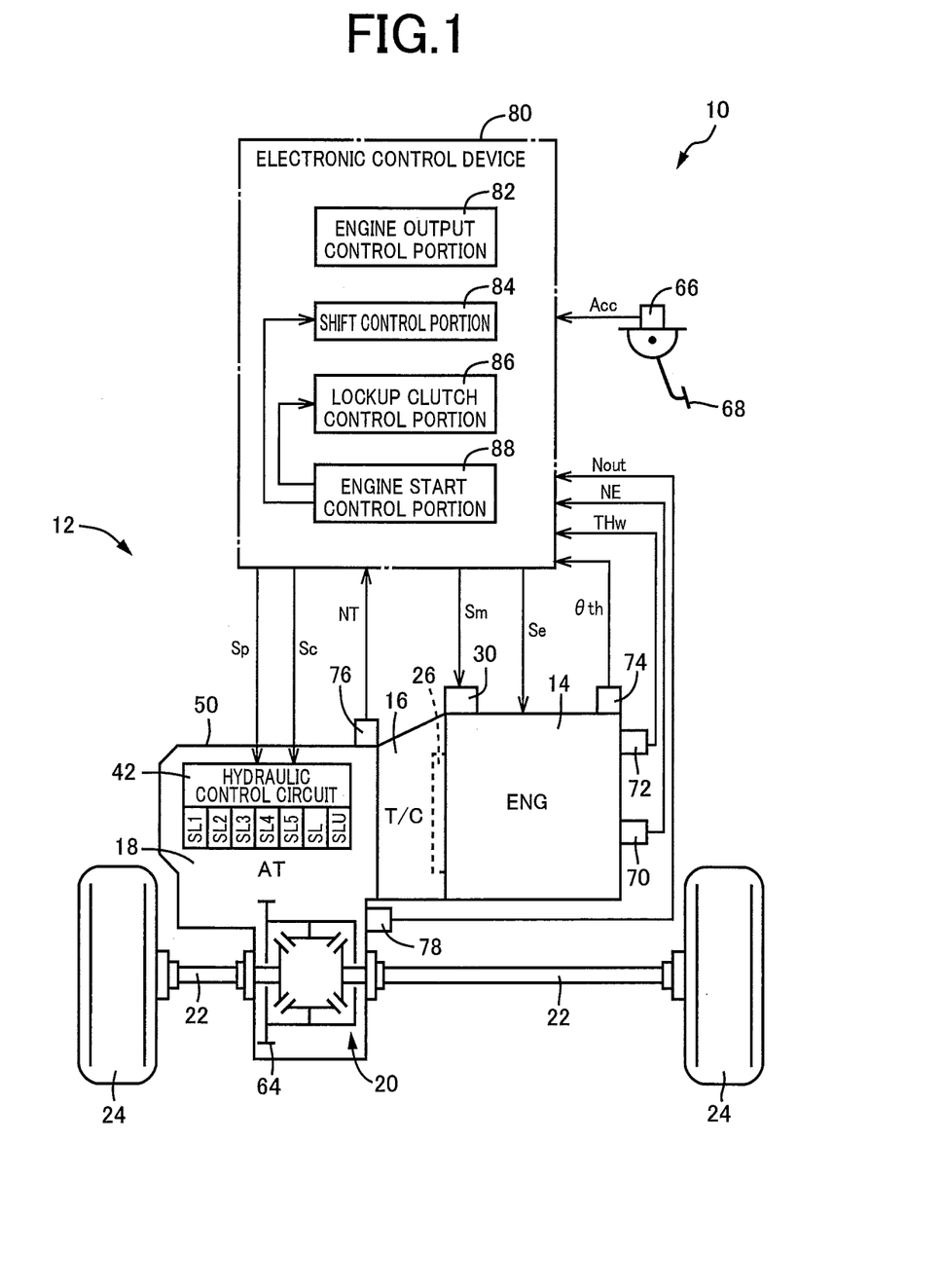
FIG. 1 is a general configuration diagram of a vehicle drive device having a power transmission device.

FIG. 1 is a general configuration diagram for explaining an example of a vehicle drive device 10 having a power transmission device 12, and the power transmission device 12 includes an engine (ENG) 14, a torque converter (T/C) 16, and an automatic transmission (AT) 18 such that power is transmitted from a differential gear device 20 through left and right axles 22 to drive wheels 24. The vehicle drive device 10 is preferably used in an FF vehicle in which the vehicle drive device 10 is equipped in the lateral direction of (transversely mounted on) the vehicle. The engine 14 is an internal combustion engine such as a gasoline engine and a diesel engine generating power from combustion of fuel and the torque converter 16 corresponds to a fluid transmission device. The automatic transmission 18 is configured to establish a neutral state at which power transmission is interrupted, and corresponds to a connecting/disconnecting device.

Figure 2:
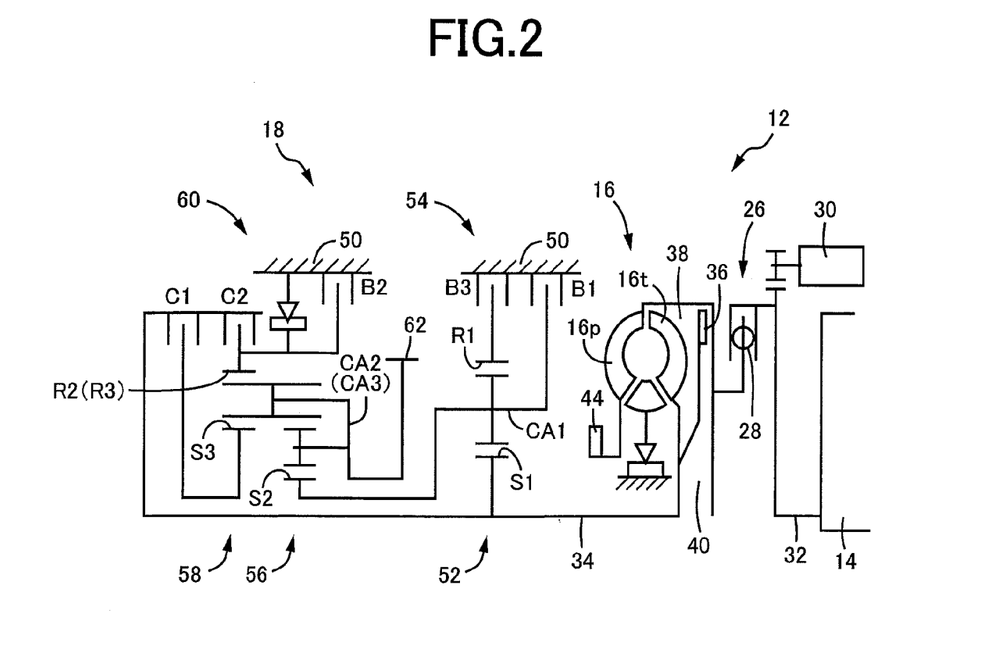
FIG. 2 is a schematic for specifically explaining the power transmission device of FIG. 1.

FIG. 2 is a schematic of the engine 14, the torque converter 16, and the automatic transmission 18, and a damper 26 is disposed between the engine 14 and the torque converter 16. The damper 26 absorbs torque variation of the engine 14 and absorbs torsional vibration and includes a plurality of compression coil springs 28 disposed around an axis. The engine 14 has a crankshaft 32 rotationally driven by a starter motor 30 at the start.

The torque converter 16 has a pump impeller 16$p$ and a turbine impeller 16$t$, outputs power transmitted via the damper 26 from the engine 14 to a turbine shaft 34 via fluid, and includes a lockup clutch (L/U clutch) 36 directly transmitting the power of the engine 14 to the turbine shaft 34 without via fluid. The lockup clutch 36 is a hydraulic friction clutch frictionally engaged by a difference pressure ΔP between an oil pressure in an engagement-side oil chamber 38 and an oil pressure in a release-side oil chamber 40 and, when the lockup clutch 36 is completely engaged (lockup-ON), the power of the engine 14 is directly transmitted to the turbine shaft 34. When the difference pressure ΔP, i.e., a torque capacity, is subjected to feed-back control such that the lockup clutch 36 is engaged in a predetermined slip state, the lockup clutch 36 is slip-engaged with a predetermined slip amount (differential rotation) of about 50 rpm, for example. Specifically, engagement (lockup-ON) and release (lockup-OFF) are switched by a solenoid valve SL disposed on a hydraulic control circuit 42 depicted in FIG. 1 and the difference pressure ΔP at the time of lockup-ON is controlled by a linear solenoid valve SLU to achieve the predetermined slip state. A mechanical oil pump 44 is connected to the pump impeller 16$p$ and is rotationally driven by the engine 14 to generate an oil pressure for engaging the lockup clutch 36 and making a shift of the automatic transmission 18.

The automatic transmission 18 has in a transmission case 50 acting as a non-rotating member attached to a vehicle body a first transmission portion 54 made up mainly of a first planetary gear device 52 of the single pinion type and a second transmission portion 60 made up mainly of a second planetary gear device 56 of the double pinion type and a third planetary gear device 58 of the single pinion type as the Ravigneaux type on a common axis and changes the speed of rotation of the turbine shaft 34 to output the rotation from an output rotating member 62. The turbine shaft 34 corresponds to an input member of the automatic transmission 18. The output rotating member 62 corresponds to an output member of the automatic transmission 18 and is an output gear, i.e., differential drive gear, meshed with a driven gear (large diameter gear) 64 of the differential gear device 20 depicted in FIG. 1 in this reference example. The automatic transmission 18 and the torque converter 16 are substantially symmetrically configured relative to a center line (axis) and the lower halves thereof from the center line are not depicted in the schematic of FIG. 2.

Figure 3:
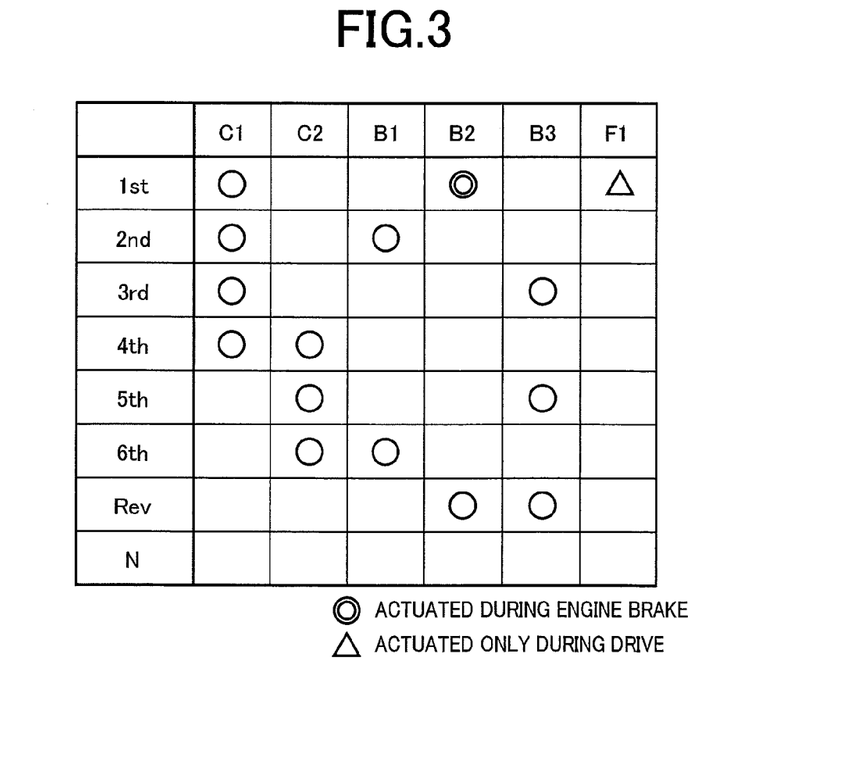
FIG. 3 is a diagram for explaining a relationship between a plurality of gear stages of an automatic transmission of FIG. 2 and engagement elements for establishing the gear stages.

The automatic transmission 18 includes two clutches C1, C2, and three brakes B1 to B3 (hereinafter simply referred to as clutches C and brakes B if not particularly distinguished) and each of the clutches C and the brakes B is engaged/released to change coupling states of rotating elements of the first transmission portion 54 and the second transmission portion 60 (sun gears S1 to S3, carriers CA1 to CA3, and ring gears R1 to R3), thereby establishing six forward gear stages from a first speed gear stage "1st" to a sixth speed gear stage "6th" as well as a reverse gear stage "Rev". The clutches C and brakes B are hydraulic friction engagement devices subjected to engagement control by hydraulic actuators, such as multi-plate type clutches and brakes, and have engaged/released states switched, and transient oil pressures at the time of engagement/release controlled, by respective linear solenoid valves SL1 to SL5 of the hydraulic control circuit 42. FIG. 3 is an operation table for explaining the operation states of the friction engagement devices when the gear stages are established, including "circles" indicative of engagement, blanks indicative of release, a "double circle" indicative of engagement only during engine brake, and a "triangle" indicative of actuation only during drive.

In FIG. 3, the forward gear stages are the first speed gear stage "1st" established by engagement of the clutch C1 and the brake B2, the second speed gear stage "2nd" established by engagement of the clutch C1 and the brake B1, the third speed gear stage "3rd" established by engagement of the clutch C1 and the brake B3, the fourth speed gear stage "4th" established by engagement of the clutch C1 and the clutch C2, the fifth speed gear stage "5th" established by engagement of the clutch C2 and the brake B3, and the sixth speed gear stage "6th" established by engagement of the clutch C2 and the brake B1. The reverse gear stage "Rev" is established by engagement of the brake B2 and the brake B3, and a neutral state "N" for interrupting the power transmission is established by releasing all of the clutches C1, C2, and the brakes B1 to B3. A gear ratio γ (=a rotation speed NT of the turbine shaft 34/a rotation speed Nout of the output rotating member 62) of each of the gear stages is defined depending on respective gear ratios (=the number of sun gear teeth/the number of ring gear teeth) ρ1, ρ2, and ρ3 of the first planetary gear device 52, the second planetary gear device 56, and the third planetary gear device 58, and the gear ratio γ of the first speed gear stage "1st" is the largest and becomes smaller on the higher speed side (toward the sixth speed gear stage "6th").

The power transmission device 12 as described above includes an electronic control device 80 as depicted in FIG. 1. The electronic control device 80 includes a so-called microcomputer including a CPU, a RAM, a ROM, an I/O interface, etc., and the CPU executes signal processes in accordance with programs stored in advance in the ROM, while utilizing a temporary storage function of the RAM, to provide output control of the engine 14, shift control of the automatic transmission 18, ON/OFF control of the lockup clutch 36, etc. The electronic control device 80 is configured separately as needed for the engine control, the shift control, etc.

The electronic control device 80 is supplied with an accelerator operation amount signal indicative of an accelerator operation amount Acc that is an operation amount of an accelerator pedal 68 detected by an accelerator operation amount sensor 66, a signal indicative of engine rotation speed NE that is the rotation speed of the engine 14 detected by an engine rotation speed sensor 70, a signal indicative of a cooling water temperature THw of the engine 14 detected by a cooling water temperature sensor 72, a throttle valve opening degree signal indicative of an opening degree θth of an electronic throttle valve detected by a throttle valve opening degree sensor 74, a signal indicative of the turbine rotation speed NT that is the rotation speed of the turbine shaft 34 detected by a turbine rotation speed sensor 76, a vehicle speed signal corresponding to the rotation speed Nout of the output rotating member 62, i.e., a vehicle speed V, detected by a vehicle speed sensor 78, etc. The cooling water temperature THw of the engine 14 corresponds to an engine temperature.

The electronic control device 80 outputs engine control signals Se such as a drive signal to a throttle actuator operating the opening degree θth of the electronic throttle valve, an ignition signal commanding an ignition timing of the engine 14, and a fuel supply amount signal controlling an amount of fuel supply to the engine 14 by a fuel injection device supplying or stopping the fuel into an intake pipe or a cylinder of the engine 14, and also outputs a motor drive signal Sm for cranking the engine 14 to the starter motor 30 when the engine 14 is started. The electronic control device 80 also outputs a shift control signal Sc controlling the linear solenoid valves SL1 to SL5 in the hydraulic control circuit 42 for switching the gear stages (including the neutral state "N") of the automatic transmission 18, a lockup control signal Sp for driving the solenoid valve SL and the linear solenoid valve SLU controlling ON/OFF and a slip amount of the lockup clutch 36, etc.

The electronic control device 80 functionally includes an engine output control means 82, a shift control means 84, a lockup clutch control means 86, and an engine start control means 88. The engine output control means 82 controls opening/closing of the electronic throttle valve with the throttle actuator depending on the accelerator operation amount Acc such that an engine output becomes larger as the accelerator operation amount Acc increases, and controls an amount of fuel injection by the fuel injection device for fuel injection control and controls the timing of ignition by an ignition device such as an igniter for ignition timing control, thereby providing the output control of the engine 14.

The shift control means 84 is a means providing the shift control, neutral control, etc. of the automatic transmission 18 and provides the shift control of the first speed gear stage "1st" to the sixth speed gear stage "6th", establishes the reverse gear stage "Rev", or releases all of the clutches C and the brakes B to achieve the neutral state "N", in accordance with a shift map set in advance by using operation states such as the vehicle speed V and the accelerator operation amount Acc as parameters.

The lockup clutch control means 86 is a means switching ON (engagement) and OFF (release) of the lockup clutch 36 and controlling a slip amount during ON and switches the ON, OFF, and slip states in accordance with a switching map set in advance by using operation states such as the vehicle speed V and the accelerator operation amount Acc as parameters. The switching map is defined such that the lockup clutch 36 is released (turned OFF) at the time of lower vehicle speed when the vehicle speed V is lower (including during vehicle stop).

Figure 4:
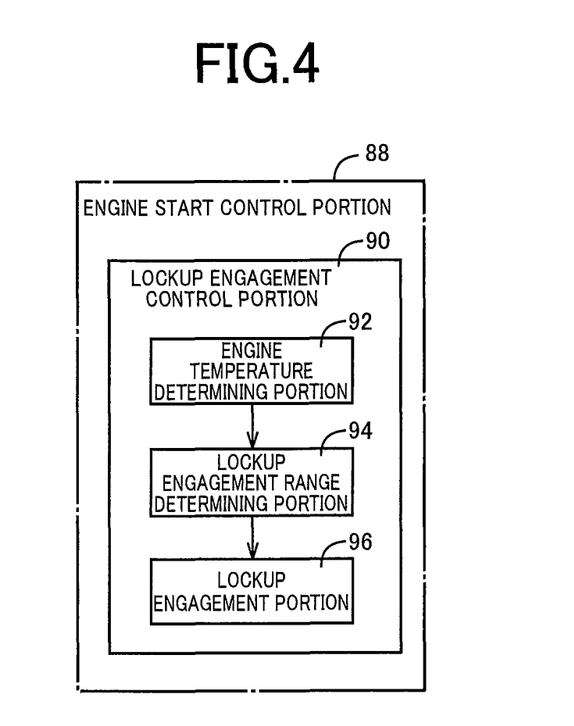
FIG. 4 is a block diagram for explaining a function included in an engine start control means of FIG. 1.
Figure 5:
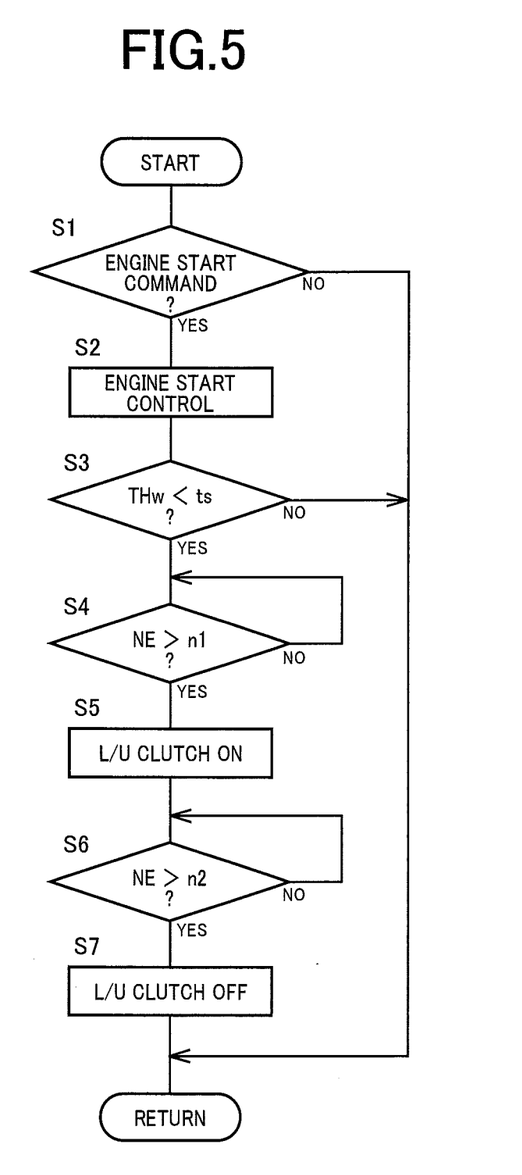
FIG. 5 is a flowchart for specifically explaining an operation of the engine start control means of FIG. 4.

The engine start control means 88 is a means for starting the engine 14 during the vehicle stop etc., and provides engine start control of cranking (rotationally driving) the engine 14 with the starter motor 30 to increase the engine rotation speed NE and performing fuel injection, ignition, etc. when the engine rotation speed NE increases to a predetermined rotation speed so as to start the engine 14 and achieve a predetermined idle rotation speed NEidl. To prevent resonance due to frequency entrainment from occurring due to presence of the damper 26 at the engine start, the engine start control means 88 engages the lockup clutch 36 under a certain condition while the automatic transmission 18 is set to the neutral state "N", and includes a lockup engagement control means 90 functionally including an engine temperature determining means 92, a lockup engagement range determining means 94, and a lockup engagement means 96 as depicted in FIG. 4. FIG. 5 is a flowchart for specifically explaining such an operation (a signal process) of the engine start control means 88, including step S3 corresponding to the engine temperature determining means 92, steps S4 and S6 corresponding to the lockup engagement range determining means 94, and steps S5 and S7 corresponding to the lockup engagement means 96. Although the engine start control means 88 has functions of the lockup engagement control means 90 in this reference example, the lockup clutch control means 86 may have the functions of the lockup engagement control means 90.

Figure 6:
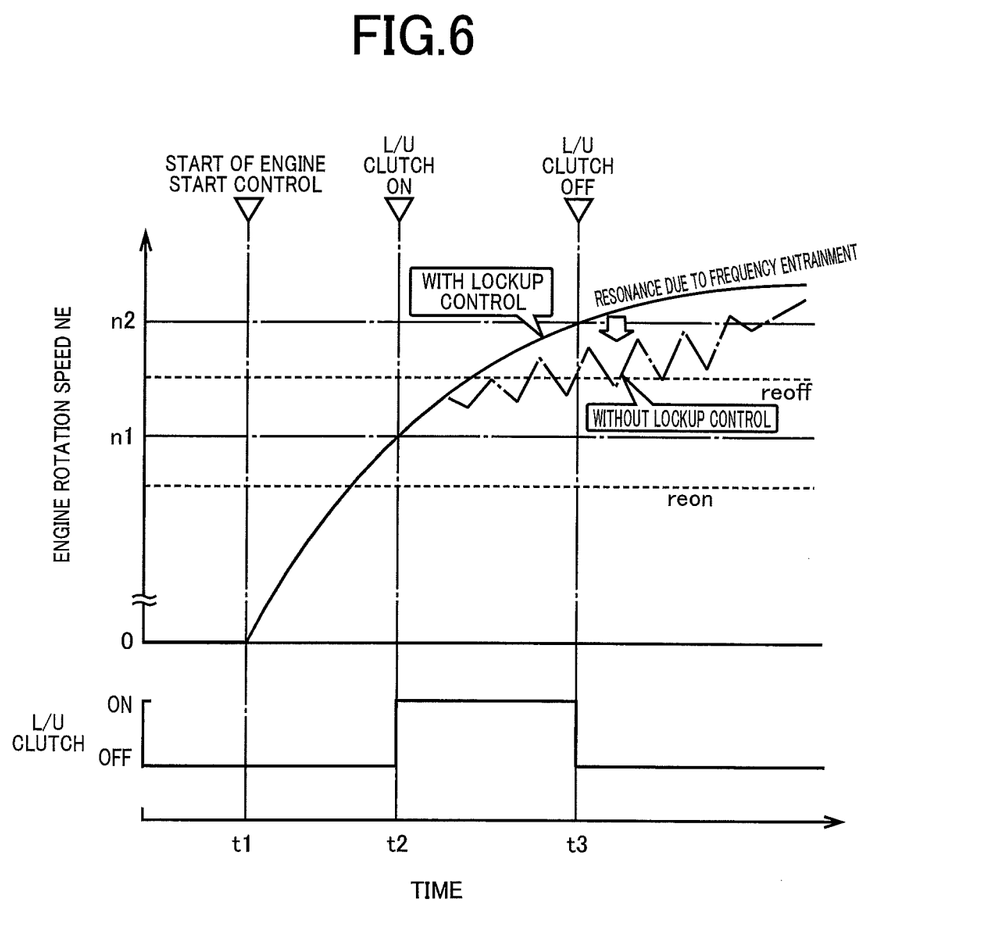
FIG. 6 is an example of a time chart of changes in an engine rotation speed NE and an actuation state of the lockup clutch when the engine start control is provided in accordance with the flowchart of FIG. 5.

The flowchart of FIG. 5 is executed when the engine is stopped, such as during the vehicle stop, for example, and it is determined at step S1 whether an engine start command is supplied due to an operation of an ignition switch, determination of cancelation of idle reduction, etc. If the engine start command is not supplied, the operation is directly terminated and, if the engine start command is supplied, step S2 is executed to start the engine start control of cranking the engine 14 with the starter motor 30 and performing fuel injection, ignition, etc. In this case, if the automatic transmission 18 is not at the neutral state "N", a command for forcibly setting the automatic transmission 18 to the neutral state "N" is output to the shift control means 84 to set the automatic transmission 18 to the neutral state "N". FIG. 6 is an example of a time chart of changes in the engine rotation speed NE and an actuation state of the lockup clutch 36 when the engine start control is provided in accordance with the flowchart of FIG. 5 and time t1 is a time when the determination of step S1 turns to YES (becomes affirmative) and the engine start control is started.

At next step S3, it is determined whether the engine cooling water temperature THw is lower than a predefined determination value ts and, if THw≥ts is satisfied, the operation is directly terminated since the resonance due to frequency entrainment is not likely to occur regardless of the presence of the damper 26 and, if THw<ts is satisfied, lockup engagement control from step S4 is provided. This is because when the engine cooling water temperature THw, i.e., the engine temperature is lower, engine friction torque becomes larger, resulting in larger rotation resistance of the engine 14, which facilitates the resonance due to frequency entrainment due to the damper 26 and, therefore, the lockup engagement control is provided only in a lower temperature range in which the resonance due to frequency entrainment may occur, and the determination value ts is set to, for example, a constant value of about −10 degrees C. to −15 degrees C., based on temperature characteristics of the engine friction torque, presence/absence of occurrence of resonance, etc., so as to include a temperature range in which the resonance due to frequency entrainment may occur.

Figure 7:
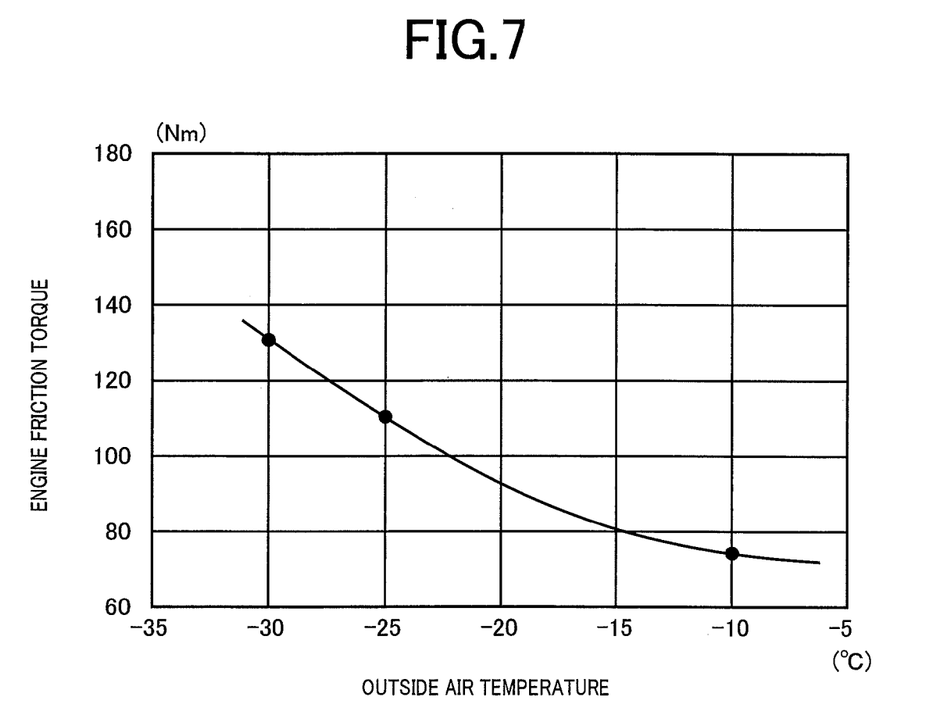
FIG. 7 is a diagram depicting an example of results of examination into a relationship between outside air temperatures and an engine friction torque.
Figure 8:
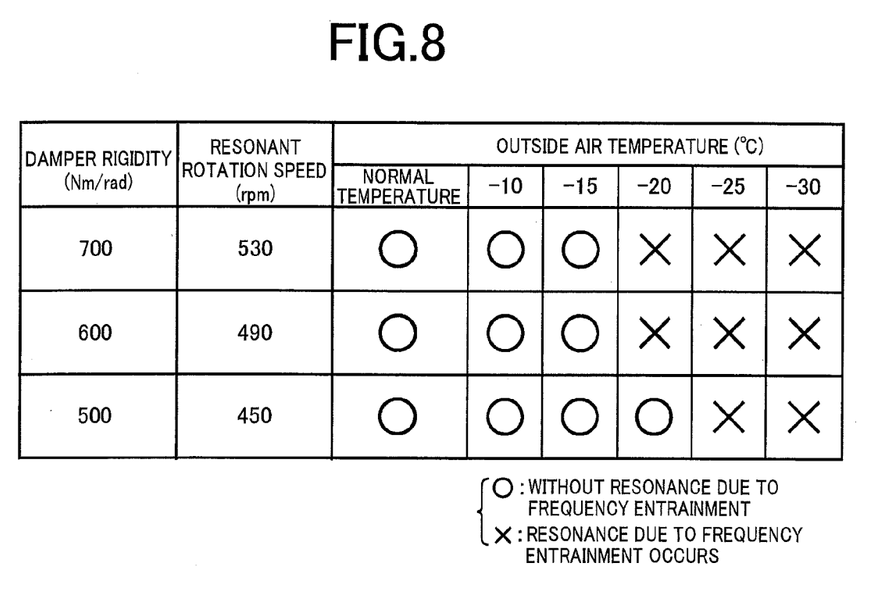
FIG. 8 is a diagram depicting an example of results of examination into a presence/absence of the resonance due to frequency entrainment when the outside air temperature and the resonant rotation speed (damper rigidity) were respectively changed and the engine was cranked.
Figure 9:
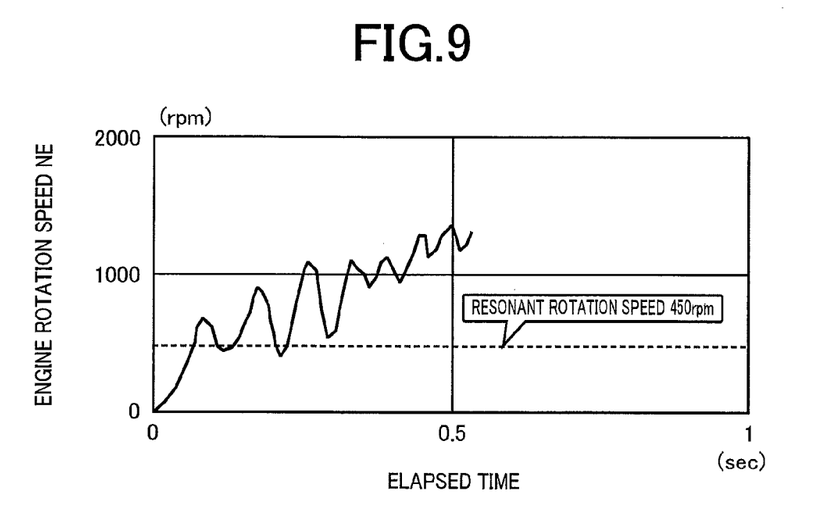
FIG. 9 is a diagram depicting an example of a change in the engine rotation speed NE when an engine was cranked at an outside air temperature of −20 degrees C. and at a resonant rotation speed of a damper of 450 rpm.
Figure 10:
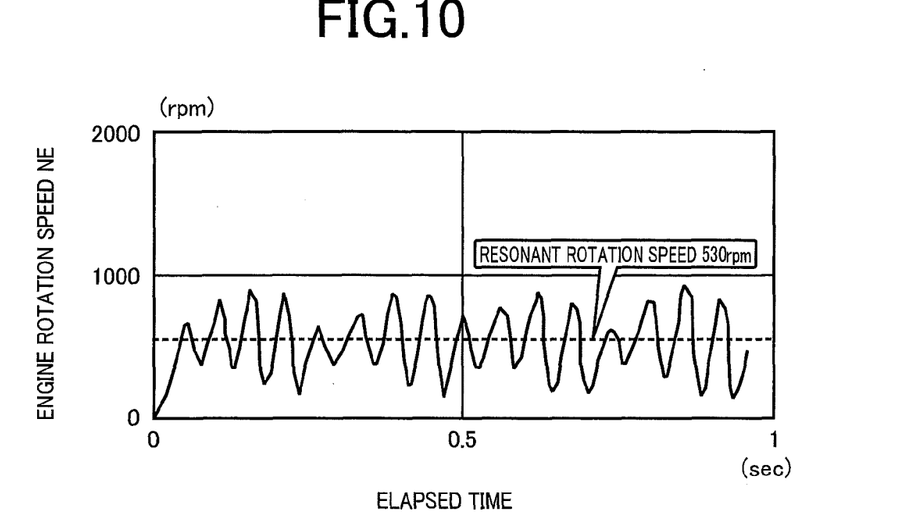
FIG. 10 is a diagram depicting an example of a change in the engine rotation speed NE when an engine was cranked at an outside air temperature of −20 degrees C. and at a resonant rotation speed of a damper of 530 rpm.

FIG. 7 depicts a result of examination of the engine friction torque, i.e., the torque required for rotational drive, when the engine 14 is rotationally driven at about 100 rpm at different outside air temperatures (engine temperatures) and, although depending on a size and a type of the engine 14, performance of engine oil, etc., the engine friction torque abruptly increased when the outside air temperature fell below −10 degrees C. in this case. When the resonant rotation speed (damper rigidity) of the damper 26 and the outside air temperature (engine temperature) were respectively changed and the engine rotation speed NE was increased by a predetermined drive torque to examine the presence/absence of the resonance due to frequency entrainment, as depicted in FIG. 8, the resonance due to frequency entrainment was more facilitated when the outside air temperature was lower and the resonant rotation speed was higher, and the resonance due to frequency entrainment was not recognized at −15 degrees C. or higher regardless of whether the resonant rotation speed is higher or lower. FIGS. 9 and 10 are examples of data (simulation) of this examination and both depict the case of −20 degrees C. with a broken line of FIG. 9 indicative of a resonant rotation speed of 450 rpm and a broken line of FIG. 10 indicative of a resonant rotation speed of 530 rpm. In FIG. 9 with the resonant rotation speed of 450 rpm, although the oscillation of the engine rotation speed NE becomes larger near the resonant rotation speed, the engine rotation speed NE smoothly increases without stagnation and the resonance due to frequency entrainment is not recognized. On the other hand, in FIG. 10 with the resonant rotation speed of 530 rpm, the engine rotation speed NE stagnates near the resonant rotation speed and the engine rotation speed NE cannot further increase because of the resonance due to frequency entrainment. It is considered that this is because an increase in the engine rotation speed NE makes the rotation resistance larger and a change gradient of the engine rotation speed NE more gradual and an influence of resonance becomes relatively greater and, therefore, the increase in the engine rotation speed NE is blocked.

Returning to FIG. 5, at step S4, it is determined whether the engine rotation speed NE reaches a predefined lockup start rotation speed n1 and if NE>n1 is satisfied, the lockup engagement control is provided at step S5. Specifically, a lockup engagement command is output to the lockup clutch control means 86 to engage the lockup clutch 36. The lockup start rotation speed n1 is set to a constant value lower than a resonant rotation speed (hereinafter also referred to as released resonant rotation speed) reoff of the damper 26 at the time of release of the lockup clutch 36 and higher than a resonant rotation speed (hereinafter also referred to as engaged resonant rotation speed) reon of the damper 26 at the time of engagement of the lockup clutch 36. When the lockup start rotation speed n1 is set, variations of the resonant rotation speeds reoff and reon due to individual differences, temporal changes, etc. of the portions can be taken into consideration so that learning and correction are performed based on a resonance occurrence status etc. The engaged resonant rotation speed reon becomes lower than the released resonant rotation speed reoff because weight of a downstream side of the damper 26 becomes larger due to engagement of the lockup clutch 36.

In this reference example, the released resonant rotation speed reoff is about 530 rpm and lower than the idle rotation speed NEidl (e.g., about 600 to 700 rpm) at the engine start and, when the engine start control is provided with the lockup clutch 36 kept released, resonance or resonance due to frequency entrainment may occur near the released resonant rotation speed reoff. The engaged resonant rotation speed reon is about 450 rpm and, when the engine start control is provided with the lockup clutch 36 engaged, resonance may occur near the engaged resonant rotation speed reon. Therefore, the lockup start rotation speed n1 is set to an intermediate value of about 490 rpm, for example, and the lockup clutch 36 is retained in the released state until the lockup start rotation speed n1 is reached. As a result, the engine rotation speed NE is increased without resonance occurring near the engaged resonant rotation speed reon. Since the lockup clutch 36 is engaged at the lockup start rotation speed n1, the engine rotation speed NE is increased without the resonance due to frequency entrainment occurring near the released resonant rotation speed reoff higher than the lockup start rotation speed n1.

Time t2 of FIG. 6 is a time when the determination of step S4 turns to YES and the lockup engagement control from the step S5 is started, and the engine rotation speed NE is smoothly increased as indicated by the solid line regardless of presence of the resonant rotation speeds reon and reoff. On the other hand, if the engine start control is provided with the lockup clutch 36 kept released, the resonance due to frequency entrainment occurs near the released resonant rotation speed reoff as indicated by a dashed-dotted line, and rotation speed variation becomes larger while the increase in the engine rotation speed NE becomes slower, resulting in a longer time required for the engine start and deterioration in NV (noise, vibration).

At step S6 of FIG. 5, it is determined whether the engine rotation speed NE reaches the predefined lockup end rotation speed n2 and, if NE>n2 is satisfied, the lockup engagement control is terminated at step S7. Specifically, a lockup release command is output to the lockup clutch control means 86 to release the lockup clutch 36. The lockup end rotation speed n2 is a constant value higher than the released resonant rotation speed reoff and lower than the idle rotation speed NEidl and is set to a value of about 560 rpm to 600 rpm, for example. Also when the lockup end rotation speed n2 is set, variation of the released resonant rotation speed reoff due to individual differences, temporal changes, etc. of the portions can be taken into consideration so that learning and correction are performed based on a resonance occurrence status etc. Time t3 of FIG. 6 is a time when the determination of step S6 turns to YES and step S7 is executed to release the lockup clutch 36.

When the engine 14 subsequently becomes capable of rotating completely by itself and reaches the idle rotation speed NEidl, a sequence of the engine start control is terminated. In this case, the shift control is provided to return the automatic transmission 18 from the neutral state "N" to a predetermined gear stage as needed when the engine is started while idling is stopped.

As described above, in the power transmission device 12 of this reference example, when the engine start control means 88 provides the engine start control, since the lockup clutch 36 is engaged in a predetermined engine rotation speed range n1 to n2 lower than the idle rotation speed Neidl while the automatic transmission 18 is in the neutral state "N", the weight of the downstream side of the damper 26 becomes larger and the resonant rotation speed decreases from reoff to reon, suppressing the occurrence of the resonance due to frequency entrainment attributable to the damper 26 at the engine start. Therefore, when the engine rotation speed NE reaches the predefined lockup start rotation speed n1 that is lower than the resonant rotation speed reoff of the damper 26 at the time of release of the lockup clutch 36 and higher than the resonant rotation speed reon of the damper 26 at the time of engagement of the lockup clutch 36, the lockup clutch 36 is engaged and the lockup clutch 36 is retained in the released state at the lockup start rotation speed n1 or less and, therefore, both the resonance and the resonance due to frequency entrainment are avoided near the resonant rotation speeds reoff and reon and the engine rotation speed NE can promptly be increased to properly start the engine 14.

Since the resonance and the resonance due to frequency entrainment attributable to the damper 26 are suppressed as described above, the engine rotation speed NE can promptly be increased to properly start the engine 14 in a short time, and the deterioration in NV (noise, vibration) attributable to the resonance and the resonance due to frequency entrainment is suppressed. Since the resonance and the resonance due to frequency entrainment are suppressed by the engagement control of the lockup clutch 36, this example does not require a change in design of a hardware portion and is easily applicable to the power transmission device 12.

Since the lockup clutch 36 is released when the engine rotation speed NE reaches the predefined lockup end rotation speed n2 higher than the resonant rotation speed reoff of the damper 26 at the time of release of the lockup clutch 36, useless continuation of the engagement control of the lockup clutch 36 is prevented while the occurrence of the resonance due to frequency entrainment is properly suppressed.

Since the lockup engagement control is provided on the condition that the engine cooling water temperature THw is low temperature lower than the predefined determination value is at which the resonance due to frequency entrainment may occur, useless provision of the engagement control of the lockup clutch 36 is prevented while the occurrence of the resonance due to frequency entrainment is properly suppressed.

Since the engagement control of the lockup clutch 36 is provided while the automatic transmission 18 is set to the neutral state "N", the device is simply and inexpensively configured as compared to when a connecting/disconnecting device interrupting the power transmission is disposed separately from the automatic transmission 18.

Example of the present invention will be described. In the following example, the portions substantially common with the reference example are denoted by the same reference numerals and will not be described in detail.

Figure 11:
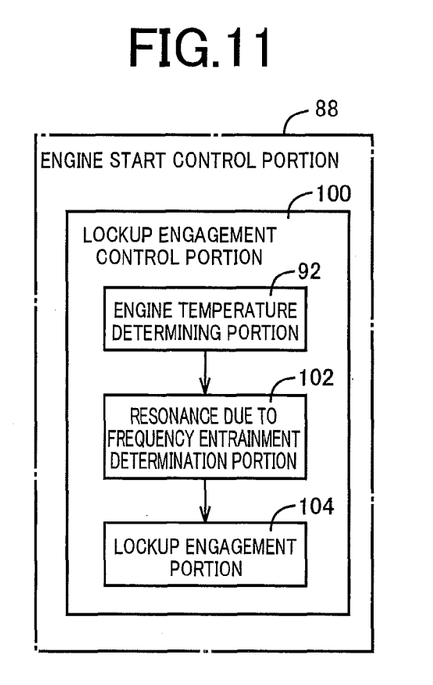
FIG. 11 is a diagram for explaining the example of the present invention and a functional block diagram of the engine start control means corresponding to FIG. 4.
Figure 12:
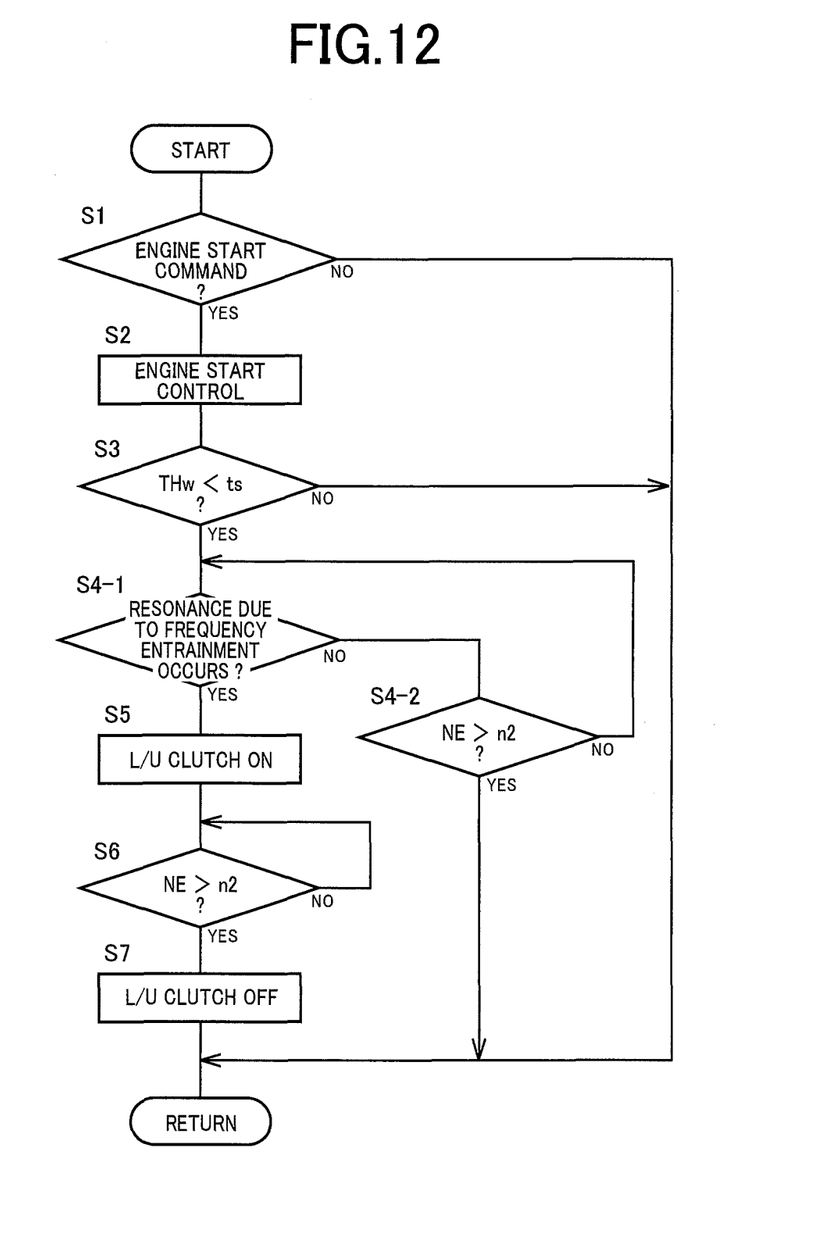
FIG. 12 is a flowchart for specifically explaining an operation of the engine start control means of FIG. 11.
Figure 13:
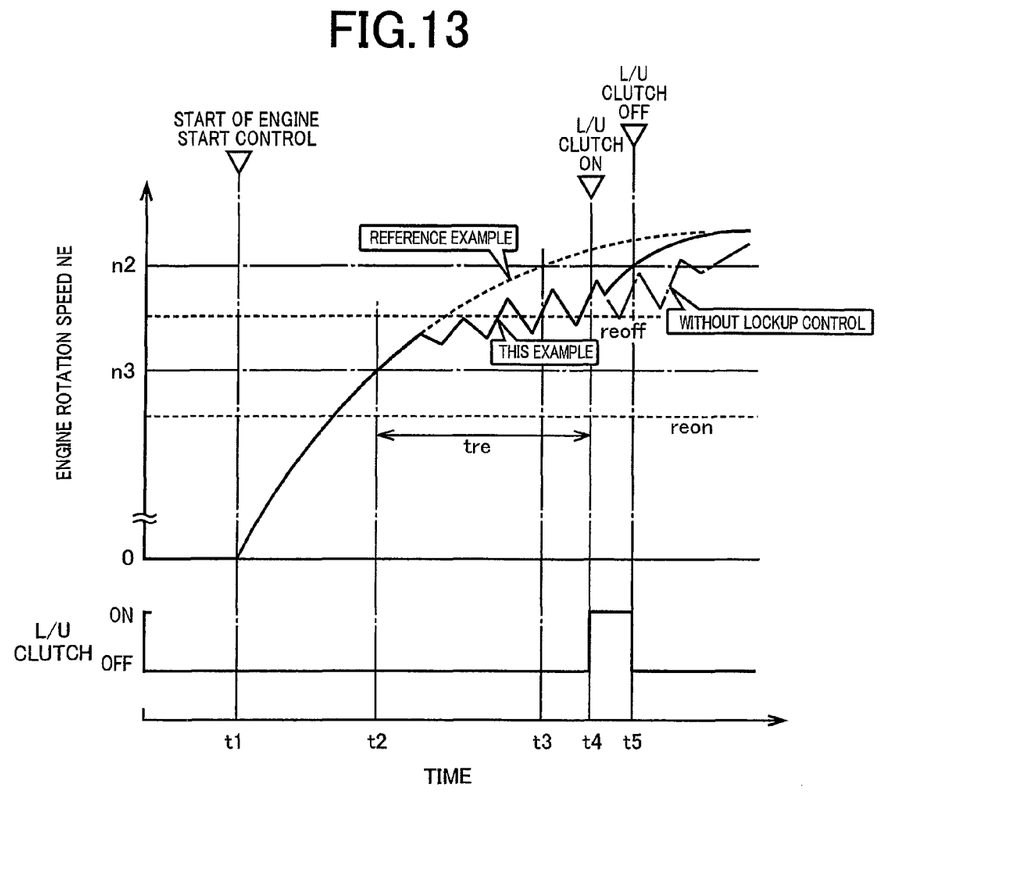
FIG. 13 is an example of a time chart of changes in the engine rotation speed NE and an actuation state of the lockup clutch when the engine start control is provided in accordance with the flowchart of FIG. 12.

FIGS. 11, 12, and 13 are diagrams corresponding to FIGS. 4, 5, and 6, respectively, and a lockup engagement control means 100 of this example includes a resonance due to frequency entrainment determination means 102 and a lockup engagement means 104 instead of the lockup engagement range determining means 94 and the lockup engagement means 96 and executes a signal process in accordance with a flowchart of FIG. 12. FIG. 12 includes step S3 corresponding to the engine temperature determining means 92, steps S4-1 and S4-2 corresponding to the resonance due to frequency entrainment determination means 102, and steps S5 to S7 corresponding to the lockup engagement means 104.

The flowchart of FIG. 12 has the same steps S1 to S3 and S5 to S7 as the reference example and is different in that steps S4-1 and S4-2 are included instead of step S4. At step S4-1, it is determined whether resonance due to frequency entrainment occurs that blocks an increase in the engine rotation speed NE. Whether resonance due to frequency entrainment occurs can be determined by whether a predefined resonance determination time is exceeded by a required start time of the engine rotation speed NE or an elapsed time until a predetermined rotation speed is reached, for example. In this example, as depicted in a time chart of FIG. 13, the determination is made by whether a predefined resonance determination time tre is reached by an elapsed time after the engine rotation speed NE exceeds a determination start rotation speed n3 and step S4-2 is executed until the resonance determination time tre is reached. The determination start rotation speed n3 is defined as a rotation speed that is lower than the released resonant rotation speed reoff and that is on the same level as the lockup start rotation speed n1, for example.

At step S4-2, it is determined whether the engine rotation speed NE exceeds the lockup end rotation speed n2 and the step S4-1 is repeated during NE≤n2. If the engine rotation speed NE exceeds the lockup end rotation speed n2 before the resonance determination time tre is reached, it is determined that the engine rotation speed NE passes through the released resonant rotation speed reoff without occurrence of the resonance due to frequency entrainment, and the engine start control is continued without providing the lockup engagement control. On the other hand, if the resonance determination time tre is reached before the engine rotation speed NE exceeds the lockup end rotation speed n2, it is determined that the resonance due to frequency entrainment occurs, and the determination of step S4-1 turns to YES and the lockup engagement control from step S5 is provided. The resonance determination time tre is defined based on, and to a time slightly longer than, a normally required time until the engine rotation speed NE reaches the lockup end rotation speed n2 from the determination start rotation speed n3 without occurrence of the resonance due to frequency entrainment. This prevents the lockup engagement control from being provided even when the resonance due to frequency entrainment does not occur.

Time t4 of FIG. 13 is a time when the resonance determination time tre is reached by the elapsed time after the engine rotation speed NE exceeds the determination start rotation speed n3, turning the determination of step S4-1 to YES, and the lockup engagement control from step S5 is started. Time t5 is a time when the engine rotation speed NE reaches the lockup end rotation speed n2, turning the determination of step S6 to YES, and the lockup clutch 36 is released. The lockup engagement means 104 of this example has a function of determining whether the engine rotation speed NE reaches the lockup end rotation speed n2 and terminating the lockup engagement control if the lockup end rotation speed n2 is reached.

As described above, when the lockup engagement control is provided at the time of determination of the occurrence of the resonance due to frequency entrainment, the resonant rotation speed of the damper 26 decreases from the released resonant rotation speed reoff to the engaged resonant rotation speed reon and the engine rotation speed NE relatively goes out of a resonant rotation speed range. Therefore, the engine rotation speed NE escapes from the resonance due to frequency entrainment and is promptly increased as indicated by a solid line in FIG. 13 and the engine 14 is promptly started as compared to when the lockup control is not provided as indicated by a dashed-dotted line. A broken line of FIG. 13 represents the case of the reference example, or the case that sufficiently high engine temperature allows the engine rotation speed NE to promptly increase without occurrence of the resonance due to frequency entrainment.

Also in this example, when the engine start control means 88 provides the engine start control, since the lockup clutch 36 is engaged in a predetermined engine rotation speed range lower than the idle rotation speed NEidl, the weight of the downstream side of the damper 26 becomes larger and the resonant rotation speed decreases from reoff to reon, suppressing the occurrence of the resonance due to frequency entrainment attributable to the damper 26. In particular, it is determined whether the resonance due to frequency entrainment occurs and, if the resonance due to frequency entrainment occurs, the lockup clutch 36 is engaged to reduce the resonant rotation speed of the damper 26 so that the engine rotation speed NE is allowed to relatively go out of the resonant rotation speed range, to escape from the resonance due to frequency entrainment, and to promptly increase. As a result, since the engine 14 can properly be started in a short time and the deterioration in NV (noise, vibration) attributable to the resonance due to frequency entrainment is suppressed, the same effects as the reference example are acquired. Since the lockup clutch 36 is subjected to the engagement control if the resonance due to frequency entrainment actually occurs, the useless provision of the engagement control of the lockup clutch 36 is prevented as compared to when the engagement control of the lockup clutch 36 is always uniformly provided in a predetermined engine rotation speed range.

Although the examples of the present invention have been described in detail with reference to the drawings, these are merely an embodiment and the present invention can be implemented in variously modified and improved forms based on the knowledge of those skilled in the art.

NOMENCLATURE OF ELEMENTS

10: vehicle drive device 12: power transmission device 14: engine 16: torque converter (fluid transmission device) 18: automatic transmission (connecting/disconnecting device) 26: damper 36: lockup clutch 70: engine rotation speed sensor 72: cooling water temperature sensor 80: electronic control device 88: engine start control means 90, 100: lockup engagement control portion 92: engine temperature determining means 94: lockup engagement range determining means 96, 104: lockup engagement portion 102: resonance due to frequency entrainment determination portion NE: engine rotation speed THw: engine cooling water temperature (engine temperature) reoff: released resonant rotation speed reon: engaged resonant rotation speed n1: lockup start rotation speed n2: lockup end rotation speed n3: determination start rotation speed tre: resonance determination time

The invention claimed is:
1. A control device of a power transmission device including a damper absorbing torsional vibration between a fluid transmission device with a lockup clutch and an engine,
the power transmission device being disposed with a connecting/disconnecting device capable of connecting and interrupting power transmission on the downstream side of the fluid transmission device,
the control device having a lockup engagement control portion engaging the lockup clutch while the power transmission is interrupted by the connecting/disconnecting device in a predetermined engine rotation speed range lower than an idle rotation speed when the engine is started,
the lockup engagement control portion including: a resonance due to frequency entrainment determination portion determining whether a resonance due to frequency entrainment occurs that blocks an increase in an engine rotation speed depending on whether a predefined resonance determination time is exceeded by a required start time of the engine or an elapsed time until the engine rotation speed reaches a predetermined rotation speed;
a lockup engagement portion engaging the lockup clutch while the power transmission is interrupted by the connecting/disconnecting device when the resonance due to frequency entrainment determination portion determines that the resonance due to frequency entrainment occurs.

2. The control device of a power transmission device of claim 1, wherein the resonance due to frequency entrainment determination portion determines whether the resonance due to frequency entrainment occurs based on an elapsed time after the engine rotation speed exceeds a predetermined determination start rotation speed that is lower than a resonant rotation speed of the damper at the time of release of the lockup clutch.

3. The control device of a power transmission device of claim 1, wherein when the engine rotation speed reaches a predefined lockup end rotation speed that is higher than the resonant rotation of the damper at the time of release of the lockup clutch, the lockup engagement portion releases the lockup clutch.

4. The control device of a power transmission device of claim 1, wherein
   the lockup engagement control portion provides an engagement control of the lockup clutch on condition that temperature of the engine is lower than a predefined determination value at which a resonance due to frequency entrainment possibly occurs.

5. The control device of a power transmission device of claim 1, wherein
   the connecting/disconnecting device is an automatic transmission configured to establish a neutral state at which power transmission is interrupted, and wherein
   the lockup engagement control portion provides an engagement control of the lockup clutch while the automatic transmission is in the neutral state.

\* \* \* \* \*